US008159970B2

(12) United States Patent
Kim et al.

(10) Patent No.: US 8,159,970 B2
(45) Date of Patent: Apr. 17, 2012

(54) METHOD OF TRANSMITTING IMAGE DATA IN VIDEO TELEPHONE MODE OF A WIRELESS TERMINAL

(75) Inventors: Hwan Kim, Gumi-si (KR); Jeong-Hoon Kim, Gumi-si (KR); Chae-Whan Lim, Daegu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1633 days.

(21) Appl. No.: 11/377,680

(22) Filed: Mar. 17, 2006

(65) Prior Publication Data

US 2007/0041337 A1    Feb. 22, 2007

(30) Foreign Application Priority Data

Aug. 11, 2005 (KR) .................. 10-2005-0073692

(51) Int. Cl.
*H04L 12/02* (2006.01)
(52) U.S. Cl. ............................................. 370/254
(58) Field of Classification Search .............. 370/260, 370/352, 263, 435
See application file for complete search history.

(56) References Cited

U.S. PATENT DOCUMENTS

| | | | |
|---|---|---|---|
| 5,046,080 A | | 9/1991 | Lee et al. |
| 5,953,505 A * | | 9/1999 | Chida .......................... 709/228 |
| 6,026,097 A * | | 2/2000 | Voois et al. .................... 370/468 |
| 6,216,152 B1 * | | 4/2001 | Wong et al. ................... 709/203 |
| 6,256,612 B1 | | 7/2001 | Vo et al. |
| 6,356,945 B1 * | | 3/2002 | Shaw et al. .................... 709/231 |
| 6,373,839 B1 * | | 4/2002 | Clark et al. .................... 370/352 |
| 6,404,776 B1 * | | 6/2002 | Voois et al. .................... 370/468 |
| 6,611,674 B1 * | | 8/2003 | Jokimies et al. ................. 455/69 |
| 6,633,582 B1 * | | 10/2003 | Panburana et al. ........... 370/465 |
| 6,785,885 B2 * | | 8/2004 | Norris et al. ................... 717/178 |
| 7,002,992 B1 * | | 2/2006 | Shaffer et al. ................. 370/468 |
| 7,130,618 B2 * | | 10/2006 | Yokoyama ................. 455/414.1 |
| 7,158,788 B2 * | | 1/2007 | Holler et al. .................. 455/445 |
| 7,266,611 B2 * | | 9/2007 | Jabri et al. ..................... 709/231 |
| 7,353,251 B1 * | | 4/2008 | Balakrishnan ................ 709/204 |
| 7,468,983 B2 * | | 12/2008 | Requena et al. .............. 370/401 |
| 7,522,712 B2 * | | 4/2009 | Inon .......................... 379/88.26 |
| 7,620,052 B2 * | | 11/2009 | Witzel et al. ............. 370/395.21 |
| 7,630,308 B1 * | | 12/2009 | Loher ......................... 370/230.1 |
| 7,821,953 B2 * | | 10/2010 | Yarlagadda et al. .......... 370/252 |
| 2003/0143985 A1 | | 7/2003 | Yokoyama |
| 2004/0071212 A1 | | 4/2004 | Gu et al. |

(Continued)

FOREIGN PATENT DOCUMENTS

KR    102030052456    6/2003

(Continued)

*Primary Examiner* — Ricky Ngo
*Assistant Examiner* — Ben Liu
(74) *Attorney, Agent, or Firm* — Roylance, Abrams, Berdo & Goodman, L.L.P.

(57) ABSTRACT

Disclosed is a method of communicating image data to a second communications device from a first communications device while the first communications device is in an image communications mode of operation. The method includes the steps of checking the codecs of the second communications device when receiving an image communication; storing the codecs of the second communications device if the codecs of the first communications device do not match with the codecs of the second communications device; and encoding selected image data using one of the codecs of the second communications device when the encoded selected image data is to be transmitted to the second communications device.

18 Claims, 2 Drawing Sheets

U.S. PATENT DOCUMENTS

| | | | |
|---|---|---|---|
| 2004/0196900 A1* | 10/2004 | Lim et al. | 375/240 |
| 2004/0252681 A1* | 12/2004 | Rabipour et al. | 370/360 |
| 2005/0013309 A1* | 1/2005 | Ravishankar et al. | 370/401 |
| 2005/0201336 A1 | 9/2005 | Lee | 370/335 |
| 2006/0170778 A1* | 8/2006 | Ely et al. | 348/207.99 |
| 2006/0242320 A1* | 10/2006 | Nettle et al. | 709/245 |

FOREIGN PATENT DOCUMENTS

| | | |
|---|---|---|
| KR | 1020050000762 | 1/2005 |
| WO | WO 03/039154 A | 5/2003 |
| WO | WO 2004/030369 A | 4/2004 |

* cited by examiner

METHOD OF TRANSMITTING IMAGE DATA IN VIDEO TELEPHONE MODE OF A WIRELESS TERMINAL

CROSS-REFERENCE TO RELATED PATENT APPLICATION

This application claims the benefit under 35 U.S.C. §119 (a) of Korean Patent Application No. 2005-73692, filed Aug. 11, 2005, in the Korean Intellectual Property Office, the entire disclosure of which is hereby incorporated by reference.

BACKGROUND OF THE INVENTION

1. Field of the Invention

The present invention relates to a method of transmitting image data in video telephone mode of a wireless terminal. More particularly, the present invention relates to a method of transmitting image data encoded by a codec supported by the other party's wireless terminal.

2. Description of the Related Art

Current wireless mobile phones are enabled for high-speed data transmission in addition to conventional voice communication. Specifically, mobile communication networks operating according to the IMT 2000 specification may facilitate high-speed data communication in addition to voice communication with a wireless mobile terminal. The data transmitted with a wireless terminal in data communication may include packet data and video data. Wireless terminals have also been provided with a camera and TV receiver in order to add a video display function. The camera and TV receiver enables the wireless terminal to display or transmit moving or still pictures taken by the camera, and to display received TV signals.

Thus, a wireless terminal having a video communication function enables the user to transmit and receive video data together with audio data. However, if the codec of the user's wireless terminal is not compatible with that of the other party's wireless terminal, the video data exchanged can not be decoded.

Accordingly, there is a need for an improved wireless terminal having a means for encoding image data that is compatible with another party's wireless terminal so that the two parties may exchange image data regardless of having different codecs.

SUMMARY OF THE INVENTION

Exemplary embodiments of the present invention address at least the above problems and/or disadvantages and provide at least the advantages described below. Accordingly, an aspect of the present invention is to provide a method of transmitting video data encoded, by a codec supported by another party's wireless terminal, in the video telephone mode of a wireless terminal.

According to an aspect of an exemplary embodiment of the present invention, a method of communicating image data to a second communications device from a first communications device while the first communications device is in an image communications mode of operation comprises the step of checking one or more codecs of the second communications device when receiving an image communication and storing one or more of the codecs of the second communications device. Additionally, the method includes the step of encoding selected image data using one of the codecs of the second communications device when the encoded selected image data is to be communicated to the second communications device.

According to another aspect of an exemplary embodiment of the present invention, a method of communicating image data to a second communications device from a first communications device while the first communications device is in an image communications mode of operation comprises the step of checking the codecs of the second communications device when receiving an image communication. Additionally, the method includes the step of storing the codecs of the second communications device if the codecs of the first communications device do not match with the codecs of the second communications device. Further, the method includes the step of encoding selected image data using one of the codecs of the second communications device when the encoded selected image data is to be transmitted to the second communications device.

According to still another aspect of an exemplary embodiment of the present invention, a method of communicating image data to a second communications device from a first communications device while the first communications device is in an image communications mode of operation comprises the step of exchanging codec information with second communications device when receiving an image communication. Additionally, the method includes the step of comparing the codecs stored in a image codec list of the first communications device with those in a image codec list of the second communications device. Further, the method includes the step of storing one or more of the codecs of the image codec list of the second communications device if the codecs of the image codec list of the first communications device do not match with the codecs of second communications device. Also, the method includes the step of encoding selected image data using one of the codecs of the second communications device when the encoded selected image data is to be transmitted to the second communications device.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
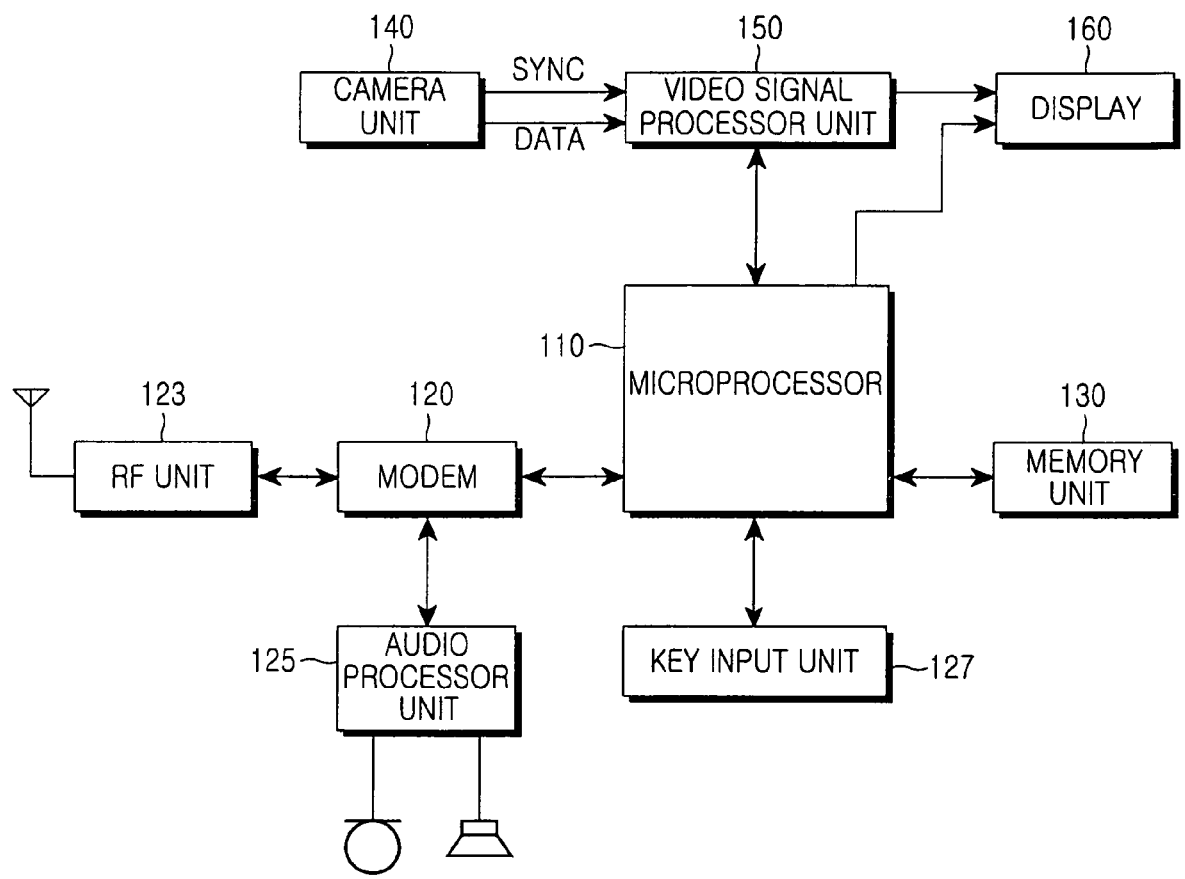
FIG. 1 is a block diagram illustrating the functional structure of a wireless terminal according to an exemplary embodiment of the present invention.

Referring to FIG. 1, an RF unit 123 for wireless communications comprises an RF transmitter for modulating and amplifying a signal for transmission and an RF receiver for demodulating and low-noise amplifying a received signal. A modem 120 is used for transforming digital signals from a microprocessor 110 into the corresponding analog signals delivered to the RF unit 123, or analog signals from the RF unit into the corresponding digital signals delivered to an audio processor 125 or the microprocessor 110. The audio processor 125 comprises a data codec for processing packet data and an audio codec for processing audio signals such as voice signals. The audio processor 125 converts the digital audio signals from the modem 120 into corresponding analog signals to be delivered to a speaker, or the analog audio signals from a microphone into corresponding digital signals to be delivered to the modem 120. The audio processor may be a separate unit or a built-in element of the microprocessor 110.

A memory device 130 comprises program memory and data memory. The program memory is for storing the programs used for controlling the general operations of the wireless terminal, including the program for controlling the operation of encoding video data by a codec of the other party's wireless terminal to be transmitted, according to an exemplary embodiment of the present invention. Meanwhile, the data memory serves to temporarily store the data generated during execution of the programs.

The memory device 130 also includes a buffer for storing the codecs of the other party's wireless terminal for video data exchange. In addition, the buffer stores the optimum codec for maximizing the encoding speed that is extracted from the codecs stored in a video codec list of the other party's wireless terminal. The optimum codec is a codec for maximizing an encoding speed, maximizing a decoding speed, and/or minimizing a size of the encoded data. Further, the optimum codec is at least the first codec of a prioritized list of codecs of the other party's wireless terminal, wherein the codecs are arranged in order with the first codec being the optimum codec. The buffer also stores codec information classified according to the kinds of image data, such as moving or still picture data.

The microprocessor 110 controls the functions of the wireless terminal, and may be designed so as to include the modem 120 and the audio processor. The microprocessor 110 controls the memory device 130 to store the codecs of the other party's wireless terminal into the buffer when receiving a video telephone call. The microprocessor 110 also controls video data to be encoded by the codec of the other party's wireless terminal for transmission.

Also provided is a camera unit 140 which comprises a camera sensor for converting the optical signals of a captured image into corresponding analog electrical signals, and a signal processor for converting the analog electrical signals from the camera sensor into corresponding digital data. The camera sensor may be a CCD sensor, and the signal processor may be a DSP (Digital Signal Processor). Further, the camera sensor and the signal processor may be integrally combined, or separately formed.

A video signal processor 150 processes the video signals from the camera unit 140 by frames so as to generate frame video data fitting the characteristics and size of a display 160. The video signal processor 150 includes a video codec to compress the frame video data or decompress the compressed frame video data according to a prescribed process. The video codec may be of a JPEG, MPEG4, or Wavelet type. Of course, any type of video codec may be used. The video signal processor 150 is provided with an OSD (On Screen Display) function to generate OSD data according to the screen size under, the control of the microprocessor 110.

The display 160 displays both video signals from the video signal processor 150 and user data transferred from the microprocessor 160. The display 160 may comprise an LCD device, LCD controller, and memory for storing the video data. The LCD device may be formed with a touch screen mode to serve as an input device.

A key input device 127 includes the keys for inputting information on numbers and characters and the keys for setting various functions. It may also include a particular key for controlling video data transmission in the video telephone mode.

Described hereafter is the inventive process for transmitting image data in the video telephone mode of the wireless terminal, according to an exemplary embodiment of the present invention. The image data to be transmitted includes all kinds of images, such as moving or still images.

Figure 2:
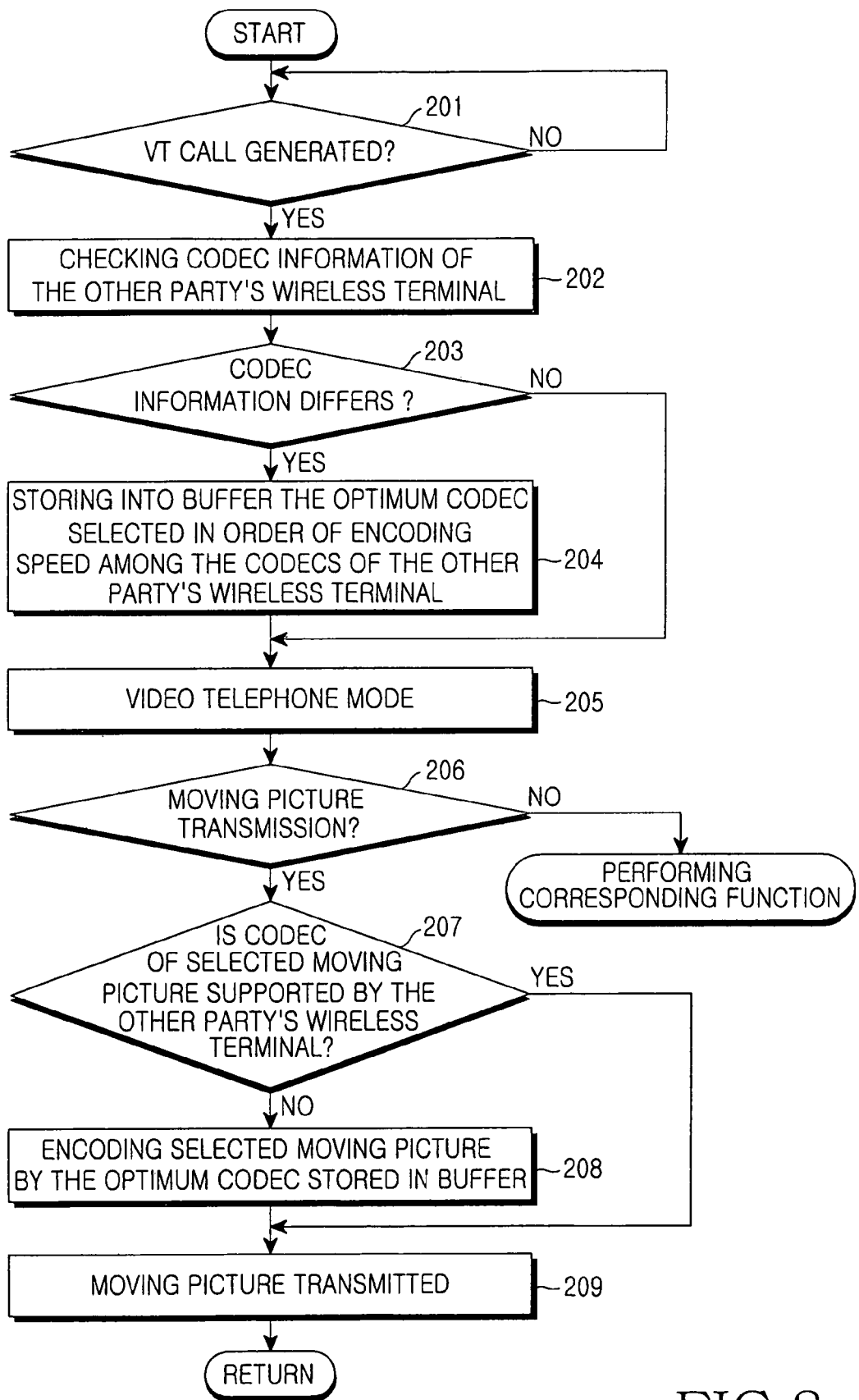
FIG. 2 is a flow chart illustrating the steps of the inventive method of transmitting video data in the video telephone mode of a wireless terminal according to an exemplary embodiment of the present invention.

Referring to FIG. 2, when receiving a video telephone call, the microprocessor 110 controls in step 201 the user's wireless terminal to exchange video communication information with the other party's wireless terminal. In step 202, the microprocessor 110 checks the codec information of the video codec list received from the other party's wireless terminal.

If the codec information of the video channel list of the other party's wireless terminal does not agree with that of the user's wireless terminal in step 203, the microprocessor 110 proceeds to step 204 to store the codecs received from the other party's wireless terminal into the buffer in step 204. The microprocessor 110 extracts from the codecs of the other party's wireless terminal the codecs that are not contained in the user's wireless terminal, and stores them into the buffer.

The optimum codec may also be extracted from the codecs of the other party's wireless terminal to be stored into the buffer. The optimum codec is a codec for maximizing an encoding speed, maximizing a decoding speed, and/or minimizing a size of the encoded data. Further, the optimum codec is at least the first codec of a prioritized list of codecs of the other party's wireless terminal, wherein the codecs are arranged in order with the first codec being the optimum codec.

After exchanging the information for performing video communication, the user's wireless terminal assumes the video telephone mode in step 205. Then, if the user selects transmission of a moving picture in step 206, the microprocessor 110 displays the kinds of moving picture data stored in the memory device 130. Selecting a kind of moving picture, the microprocessor 110 checks its codec information. If the codec information of the selected moving picture is not supported by the other party's wireless terminal in step 207, the microprocessor 110 proceeds to step 208 to encode the moving picture by the optimum codec of the other party's wireless terminal stored in the buffer. The image data encoded by the optimum codec in step 208 is transmitted to the other party's wireless terminal in step 209.

Thus, an exemplary embodiment of the present invention provides the wireless terminal with means for encoding image data by the codec of the other party's wireless terminal that is previously received from the other party's wireless terminal and stored. Thereby, the two parties may exchange image data despite having different codec information.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of communicating image data to a second communications device from a first communications device while the first communications device is in an image communications mode of operation, comprising the steps of:
    checking codec information of the second communications device when receiving an image communication request, extracting the codec information of the second communications device that is not contained in the first communications device and storing the extracted codec information of the second communications device;
    encoding selected image data using the codec information of the second communications device; and
    communicating the encoded selected image data to the second communications device;
    wherein the selected image data is encoded with a first codec prior to the encoding operation;
    wherein the step of encoding selected image data using the codec information of the second communications device comprises the steps of:
    determining whether the first codec of the selected image data is supported by the second communications device; and
    if the first codec of the selected image data is not supported by the second communications device, selecting a second codec for encoding the selected image data from the codec information of the second communications device for optimizing, with respect to the selected image data, an encoding speed, a decoding speed, and/or a size of encoded data, and encoding the selected image data using the second codec.

2. A method as defined in claim 1, wherein an optimum codec for maximizing an encoding speed, maximizing a decoding speed, and/or minimizing a size of encoded data is selected as the second codec for encoding the selected image data from the codec information of the second communications device.

3. A method as defined in claim 2, wherein the optimum codec comprises at least a first codec of a prioritized list of codecs of the second communications device, wherein the codecs are arranged in order with the first codec being the optimum codec.

4. A method as defined in claim 1, wherein the second codec information used for encoding the selected image data maximizes an encoding speed, maximizes a decoding speed, and/or minimizes a size of the encoded data.

5. A method as defined in claim 1, wherein the first communications device and/or second communications device comprises a wireless communications device.

6. A method as defined in claim 1, wherein the image data, image communications mode and image communication are video data, video communications mode and video communication, respectively.

7. A method of communicating image data to a second communications device from a first communications device while the first communications device is in an image communications mode of operation, comprising the steps of:
    checking the codec information of the second communications device when receiving an image communication request;
    extracting the codec information of the second communications device that is not contained in the first communications device and storing the extracted codec information of the second communications device if the codec information of the first communications device does not match with the codec information of the second communications device; and
    encoding selected image data using the codec information of the second communications device;
    transmitting the encoded selected image data to the second communications device;
    wherein the selected image data is encoded with a first codec prior to the encoding operation;
    wherein the step of encoding selected image data using the codec information of the second communications device comprises the steps of:
    determining whether the first codec of the selected image data is supported by the second communications device; and
    if the first codec of the selected image data is not supported by the second communications device, selecting a second codec for encoding the selected image data from the codec information of the second communications device for optimizing, with respect to the selected image data, an encoding speed, a decoding speed, and/or a size of encoded data, and encoding the selected image data using the second codec.

8. A method as defined in claim 7, wherein an optimum codec for maximizing an encoding speed, maximizing a decoding speed, and/or minimizing a size of encoded data is selected as the second codec for encoding the selected image data from the codec information of the second communications device.

9. A method as defined in claim 8, wherein the optimum codec comprises at least a first codec of a prioritized list of codecs of the second communications device, wherein the codecs are arranged in order with the first codec being the optimum codec.

10. A method as defined in claim 7, wherein the second codec information used for encoding the selected image data maximizes an encoding speed, maximizes a decoding speed, and/or minimizes a size of the encoded data.

11. A method as defined in claim 7, wherein the first communications device and/or second communications device comprises a wireless communications device.

12. A method as defined in claim 7, wherein the image data, image communications mode and image communication are video data, video communications mode and video communication, respectively.

13. A method of communicating image data to a second communications device from a first communications device while the first communications device is in an image communications mode of operation, comprising the steps of:
    exchanging codec information with second communications device when receiving an image communication;
    comparing the codec information stored in a image codec list of the first communications device with the codec information in an image codec list of the second communications device;
    extracting the codec information in the image codec list of the second communications device that is not contained in of the image codec list of the first communications device and storing the extracted codec information of the second communications device and storing the codec information in the image codec list of the second communications device if the codec information in the image codec list of the first communications device does not match with the codec information in the image codec list of the second communications device; and encoding selected image data using the codec information in the codec list of the second communications device;

transmitting the encoded selected image data to the second communications device;

wherein the selected image data is encoded with a first codec prior to the encoding operation;

wherein the step of encoding selected image data using the codec information in the image codec list of the second communications device comprises the steps of:

determining whether the first codec of the selected image data is supported by the second communications device; and if the first codec of the selected image data is not supported by the second communications device, selecting a second codec for encoding the selected image data from the codec information in the image codec list of the second communications device for optimizing, with respect to the selected image data, an encoding speed, a decoding speed, and/or a size of encoded data, and encoding the selected image data using the second codec.

14. A method as defined in claim 13, wherein an optimum codec for maximizing an encoding speed, maximizing a decoding speed, and/or minimizing a size of the encoded data is selected as the second codec for encoding the selected image data from the codec information in the codec list of the second communications device.

15. A method as defined in claim 14, wherein the optimum codec comprises at least a first codec of a prioritized list of codecs of the second communications device, wherein the codecs are arranged in order with the first codec being the optimum codec.

16. A method as defined in claim 13, wherein the second codec information used for encoding the selected image data maximizes an encoding speed, maximizes a decoding speed, and/or minimizes a size of the encoded data.

17. A method as defined in claim 13, wherein the first communications device and/or second communications device comprises a wireless communications device.

18. A method as defined in claim 13, wherein the image data, image communications mode and image communication are video data, video communications mode and video communication, respectively.

* * * * *